United States Patent
Gudesen

(10) Patent No.: US 12,110,648 B2
(45) Date of Patent: Oct. 8, 2024

(54) ENERGY ISLAND CONSTRUCTION METHOD AND SYSTEM

(71) Applicant: Hans Gude Gudesen, Gamle Fredrikstad (NO)

(72) Inventor: Hans Gude Gudesen, Gamle Fredrikstad (NO)

( * ) Notice: Subject to any disclaimer, the term of this patent is extended or adjusted under 35 U.S.C. 154(b) by 286 days.

(21) Appl. No.: 17/642,426

(22) PCT Filed: Sep. 8, 2020

(86) PCT No.: PCT/NO2020/050229
§ 371 (c)(1),
(2) Date: Mar. 11, 2022

(87) PCT Pub. No.: WO2021/049946
PCT Pub. Date: Mar. 18, 2021

(65) Prior Publication Data
US 2022/0380994 A1    Dec. 1, 2022

(30) Foreign Application Priority Data

Sep. 13, 2019  (NO) .................................. 20191109

(51) Int. Cl.
*E02B 9/06*    (2006.01)
*F03B 13/06*   (2006.01)
*F03B 13/10*   (2006.01)

(52) U.S. Cl.
CPC ............... *E02B 9/06* (2013.01); *F03B 13/06* (2013.01); *F03B 13/10* (2013.01); *F05B 2220/706* (2013.01)

(58) Field of Classification Search
CPC ..... E02B 9/02; E02B 9/04; E02B 9/06; E02B 3/046; E02D 19/02; E02D 29/06; F03B 13/06; F03B 13/10
See application file for complete search history.

(56) References Cited

U.S. PATENT DOCUMENTS 404,851 A * 6/1889 Long ..................... F03B 7/003
                                              405/75
471,805 A * 3/1892 Simpson ................. B63B 71/00
                                              405/4

(Continued)

FOREIGN PATENT DOCUMENTS

EP    2345809 A1    7/2011
EP    2886852 A1    6/2015

(Continued)

OTHER PUBLICATIONS

English language Abstract of JP H10331140 A (Dec. 15, 1998).

(Continued)

*Primary Examiner* — Benjamin F Fiorello
(74) *Attorney, Agent, or Firm* — Hershkovitz & Associates, PLLC; Abe Hershkovitz

(57) ABSTRACT

An energy island system arranged related to a body of water with a seafloor, a surface and a depth over an underground is disclosed. The system comprises a structurally rigid shell (1) extending from the seafloor to above the water surface, inclosing a lagoon of the body of water, material with a negative buoyancy stacked around the shell (1) forming a gravity stabilized wall (2), and a tunnel (5) established in the wall (2), providing for hydraulic communication between the surrounding body of water and the interior of the shell (1). Further, a method for construction of an energy island is disclosed.

18 Claims, 5 Drawing Sheets

(56) References Cited

U.S. PATENT DOCUMENTS

Figure 1A:
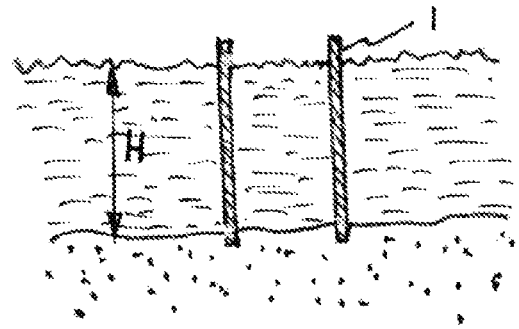

| | | | | |
|---|---|---|---|---|
| 1,863,728 | A * | 6/1932 | Porter | F03B 11/00 137/154 |
| 3,990,252 | A * | 11/1976 | Louden | E02D 17/18 405/222 |
| 4,014,173 | A * | 3/1977 | Keeling | E02B 9/00 405/78 |
| 4,182,128 | A * | 1/1980 | Gardner | F03B 13/06 60/398 |
| 4,216,655 | A * | 8/1980 | Ghesquiere | F03B 13/22 417/330 |
| 4,282,444 | A | 8/1981 | Ramer | |
| 4,310,769 | A * | 1/1982 | Mazzone | F03B 13/06 290/1 R |
| 5,389,821 | A * | 2/1995 | Moulliet | F03B 13/06 290/43 |
| 6,089,191 | A * | 7/2000 | Calinski | A01K 61/70 119/239 |
| 6,575,662 | B2 * | 6/2003 | French | C02F 1/008 405/80 |
| 6,863,028 | B2 | 3/2005 | Sherman | |
| 8,215,104 | B2 * | 7/2012 | Riley | F24T 10/20 60/398 |
| 8,274,168 | B2 | 9/2012 | Aaltonen et al. | |
| 10,359,027 | B2 * | 7/2019 | Barakat | F03B 13/08 |
| 2002/0131823 | A1 | 9/2002 | Sherman | |
| 2003/0039512 | A1 * | 2/2003 | Bethune | E02B 9/00 405/75 |
| 2004/0022584 | A1 | 2/2004 | Sherman | |
| 2012/0056430 | A1 | 3/2012 | Aaltonen et al. | |
| 2014/0197640 | A1 * | 7/2014 | Barakat | F03B 13/08 290/54 |
| 2020/0325879 | A1 | 10/2020 | Gudesen | |
| 2021/0388809 | A1 * | 12/2021 | Young | F28D 20/00 |

FOREIGN PATENT DOCUMENTS

| | | |
|---|---|---|
| JP | H10331140 A | 12/1998 |
| WO | WO 2013/044978 A1 | 4/2013 |
| WO | WO 2014/184312 A1 | 11/2014 |
| WO | WO 2019/074372 A1 | 4/2019 |

OTHER PUBLICATIONS

"Underground Pumped Hydro Storage", EERA, Fact Sheet x; 2016.

International Search Report in International Application No. PCT/NO2020/050229, mailed on Nov. 11, 2020.

Written Opinion of the International Searching Authority in International Application No. PCT/NO2020/050229, mailed on Nov. 11, 2020.

Norwegian Search Report in related Norwegian Application No. 20191109, dated Mar. 12, 2020.

Extended European Search Report in related European Application No. EP 20862924, dated Aug. 18, 2023.

* cited by examiner

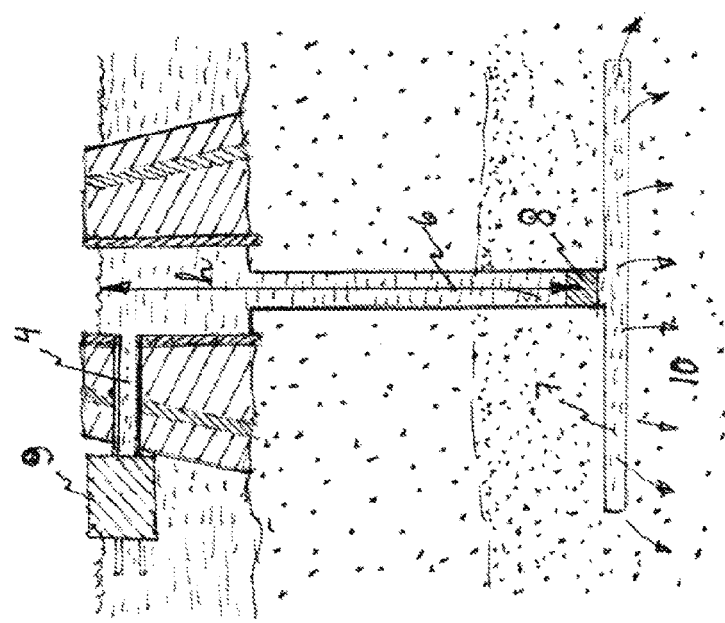
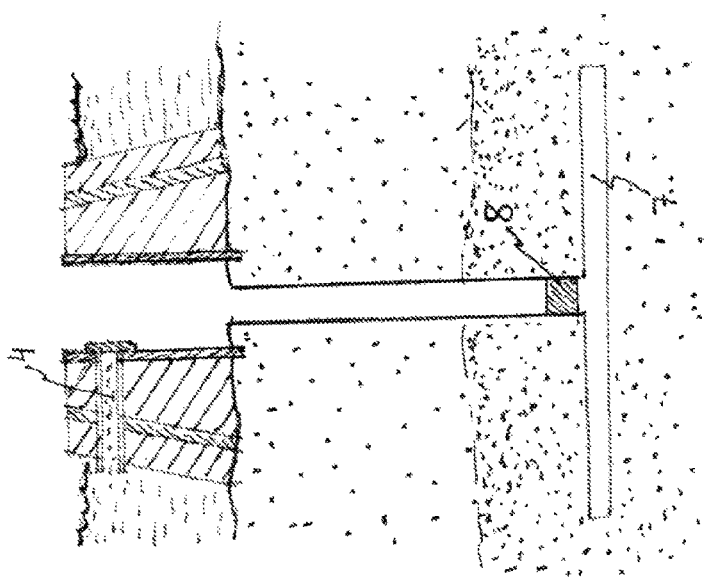
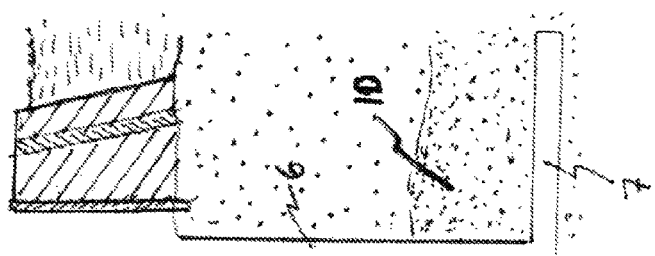
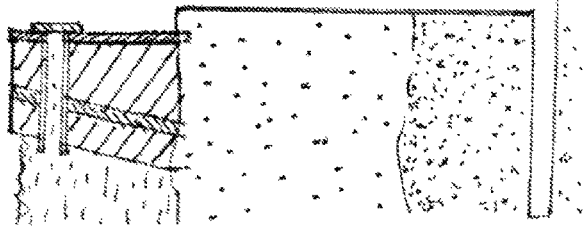
FIG. 2A          FIG. 2B          FIG. 2C

ENERGY ISLAND CONSTRUCTION METHOD AND SYSTEM

FIELD OF THE INVENTION

The present invention relates to energy storage and generation. More specifically, it relates to a subsea infrastructure comprising an energy island with a water reservoir separated from a surrounding body of water, and method for constructing the energy island.

BACKGROUND OF THE INVENTION

In many parts of the world there exist regions deep underground that under the right circumstances can receive large volumes of water. This has been exploited for removal of waste water, by transferring water through shafts drilled from the surface and down to natural recipients that are in the form of cavities, porous rock or lagoons. Such disposal practices have been employed over time spans of several years and on an industrial scale. In many cases, the vertical height between the surface and the recipient is in the range of hundreds to thousands of meters, which should indicate a significant potential for generation of hydroelectric power. As an example, the gravitational potential energy drop of water brought down from the surface to a cavity of 1 km$^3$ at a depth of 1000 m is 2.8 TWh. So far, there has been little or no interest in exploiting these opportunities. This may in large part be traced to technical issues, in particular uncertainties and risks linked to the ability of the subterranean recipient to receive water in the quantities and at the flow rates required. In many cases, the recipient may be flow limited, i.e. it may be able to accumulate large volumes of water over an extended period of time, but is limited in its ability to accept high volumes over shorter time periods. This flow limitation impacts directly on the electrical power that can be extracted and represents a serious impediment to commercial exploitation.

Pumped Hydro Storage (PHS) is well known and extensively used to store electrical energy, and involves transfer of water between a high- and a low-lying water reservoir. Energy is stored by pumping water from the lower to the higher reservoir and is recovered by allowing the water to flow back through a turbine. Underground Pumped Hydro. Storage (UPHS) is similar, but employs a lower reservoir located underground. For a recent review of UPHS, see, e.g.: https://eera-es.eu/wp-content/uploads/2016/03/EERA_Fact-sheet_Underground-Pumped-Hydro-Energy-Storage_not-final.pdf It is generally acknowledged that a large and increasing part of the future energy supply must be derived from offshore green energy sources such as windmills and solar panels, and furthermore that there must be energy storage facilities coordinated with these energy sources, preferably located on site or close by. In this context the marine environment clearly poses a problem and disqualifies traditional UPHS, which would otherwise represent one of the few viable alternatives for high capacity long term energy storage.

OBJECTS OF THE PRESENT INVENTION

A general object of the present invention is to solve problems with prior art.

A major object is to provide an infrastructure for hydroelectric energy storage and generation.

Further major objects of the present invention are to provide a cost effective and environmentally friendly subsea hydroelectric energy storage and generation.

SUMMARY OF THE INVENTION

A first aspect of the invention is an energy island construction method, where the method comprises the following steps:
  selecting a body of water with a seafloor, a surface and a depth over an underground;
  arranging a structurally rigid shell extending from the seafloor to above the water surface, enclosing a lagoon of the body of water;
  stacking material with a negative buoyancy around the shell forming a gravity stabilized wall;
  establishing a tunnel in the wall, providing for hydraulic communication between the surrounding body of water and the interior of the shell; and
  capping the tunnel with a capping structure, and evacuating water from the lagoon.

Optionally, the method comprises arranging a watertight membrane structure in the wall, the membrane structure adapted to prevent the surrounding water exerting pressure on the shell.

Optionally, the method comprises arranging a filtering station adapted to filter water passing through the tunnel.

Optionally, the method further comprises excavating a shaft in the underground below the interior of the shaft into a high permeability substratum; excavating at least one branching tunnel, the branching tunnel at least partially located in the high permeability substratum, and in hydraulic communication with the shaft; and arranging a turbine/generator combination in the shaft.

Optionally, the method further comprises arranging a pump adapted to evacuate water from the branching tunnel providing for pumped hydro energy storage.

Optionally, the method comprises removing the capping structure allowing water flowing through the tunnel from the surrounding body of water, filling the lagoon, and flowing down the shaft activating the turbine/generator combination.

Optionally, the method further comprises excavating a shaft in the underground below the lagoon into a salt deposit below a low permeability stratum; and arranging an input tube structure allowing water to pass from the body of water into the salt deposit establishing a cavity in the salt deposit.

Optionally, the method further comprises arranging a pump in the cavity in connection with an output tube structure for pumping liquid out of the cavity; and arranging a turbine in the cavity in connection with the input tube structure, the turbine adapted to be activated by water flow in the input tube structure.

Optionally, the method further comprises arranging a pump adapted to evacuate water from the lagoon into the body of water, and a turbine adapted to be activated by water from the body of water flowing through the turbine providing for lagoon based energy storage and production.

Optionally, the pump and the turbine are arranged relative to a hole in the wall allowing for water flowing between the body of water and the lagoon.

A further aspect of the invention is an energy island system arranged relative to a body of water with a seafloor, a surface and a depth over an underground. The system comprises a structurally rigid shell extending from the seafloor to above the water surface, inclosing a lagoon of the body of water; material with a negative buoyancy stacked around the shell forming a gravity stabilized wall; and a tunnel established in the wall, providing for hydraulic communication between the surrounding body of water and the interior of the shell.

Optionally, the system further comprises a capping structure arranged for capping the tunnel, and allowing for evacuating water from the lagoon, and further optionally, the system further comprises a watertight membrane structure arranged in the wall, the membrane structure adapted to prevent the surrounding water exerting pressure on the shell.

Optionally, the system comprises a filtering station adapted to filter water passing through the tunnel, and further optionally the filtering station comprises mechanical sieves in combination with living filtering organisms in the form of tunicates.

Optionally, the system further comprises a shaft extending into the underground below the interior of the shaft into a high permeability substratum; at least one branching tunnel, the branching tunnel at least partially located in the high permeability substratum, and in hydraulic communication with the shaft; and a turbine/generator combination arranged in the shaft.

Optionally, the system further comprises a pump adapted to evacuate water from the branching tunnel providing for pumped hydro energy storage.

Optionally, the capping structure is removable to allow water flowing through the tunnel from the surrounding body of water, filling the lagoon, and flowing down the shaft activating the turbine/generator combination.

Optionally, the system further comprises a shaft excavated in the underground below the lagoon into a salt deposit below a low permeability stratum; and an input tube structure allowing water to pass from the body of water into the salt deposit establishing a cavity in the salt deposit.

Optionally, the system further comprises a pump arranged in the cavity in connection with an output tube structure for pumping liquid out of the cavity; and a turbine in the cavity arranged in connection with the input tube structure, the turbine adapted to be activated by water flow in the input tube structure.

Optionally, the system further comprises a pump arranged adapted to evacuate water from the lagoon into the body of water, and a turbine adapted to be activated by water from the body of water flowing through the turbine providing for lagoon based energy storage and production.

Optionally, the pump and the turbine are arranged relative to a hole in the wall allowing for water flowing between the body of water and the lagoon.

DESCRIPTION OF THE DIAGRAMS

The above and further features of the invention are set forth with particularity in the appended claims and together with advantages thereof will become clearer from consideration of the following detailed description of exemplary embodiments of the invention given with reference to the accompanying drawing.

The invention will be further described below in connection with exemplary embodiments which are schematically shown in the drawings, wherein:

FIG. 1 A-C discloses steps of an energy island construction method according to the present invention, and the resulting energy island.

FIG. 1A discloses the step of arranging a shell structure in a body of water.

Figure 1B:
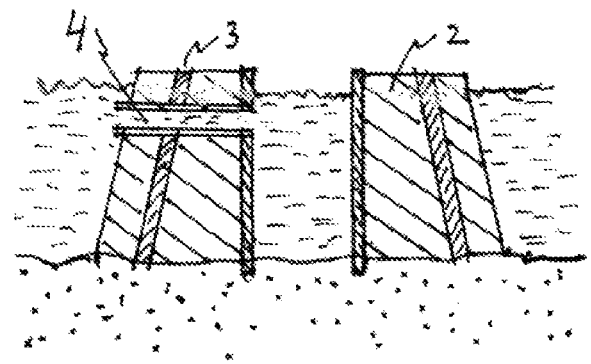

FIG. 1B discloses the further steps for forming a gravity stabilized wall with a membrane and tunnel.

Figure 1C:
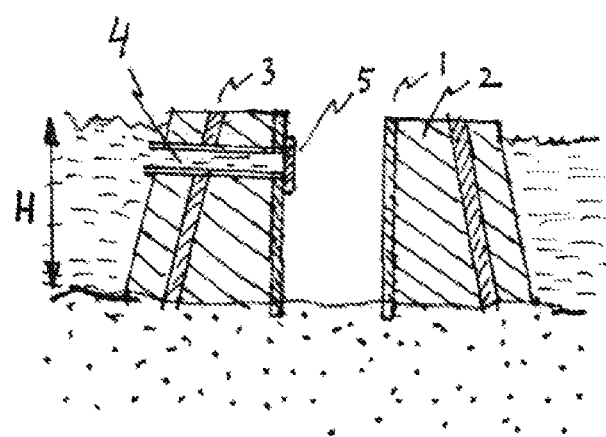

FIG. 1C discloses the steps of capping the tunnel and evacuating the volume with the shell.

FIG. 2A discloses the step of excavating a shaft with a branching tunnel in the underground.

FIG. 2B discloses the strep of introducing a turbine/generator combination in the shaft.

FIG. 2C discloses the steps of arranging a filtering station, allowing water to fill the shell and the shaft, and activating the turbine/generator combination.

Figure 3A:
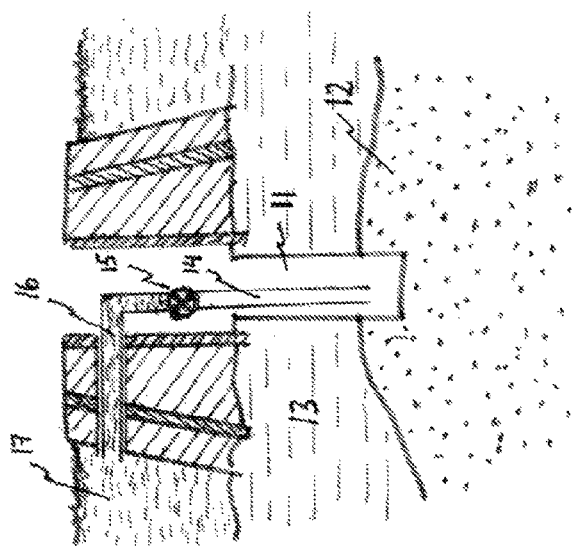

FIG. 3A discloses the step of excavating a shaft down to a salt deposit in the underground, and introducing tubes communicating with the tunnel in the wall.

Figure 3B:
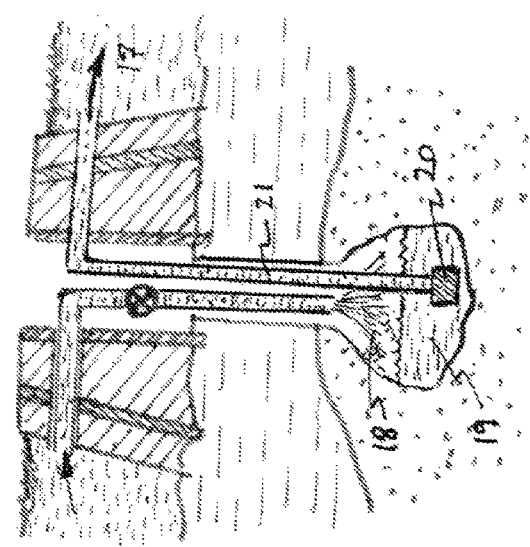

FIG. 3B discloses the strep of establishing a cavity in the salt deposit.

Figure 3C:
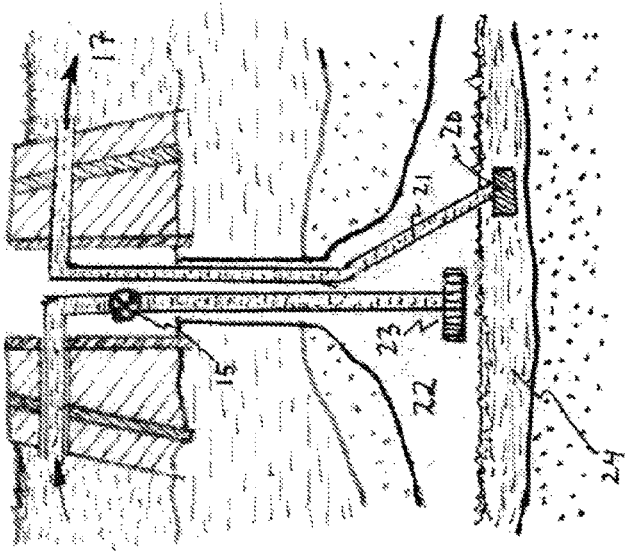

FIG. 3C discloses the steps of using the energy island as a pumped hydro energy storage and generation system.

Figure 4A:
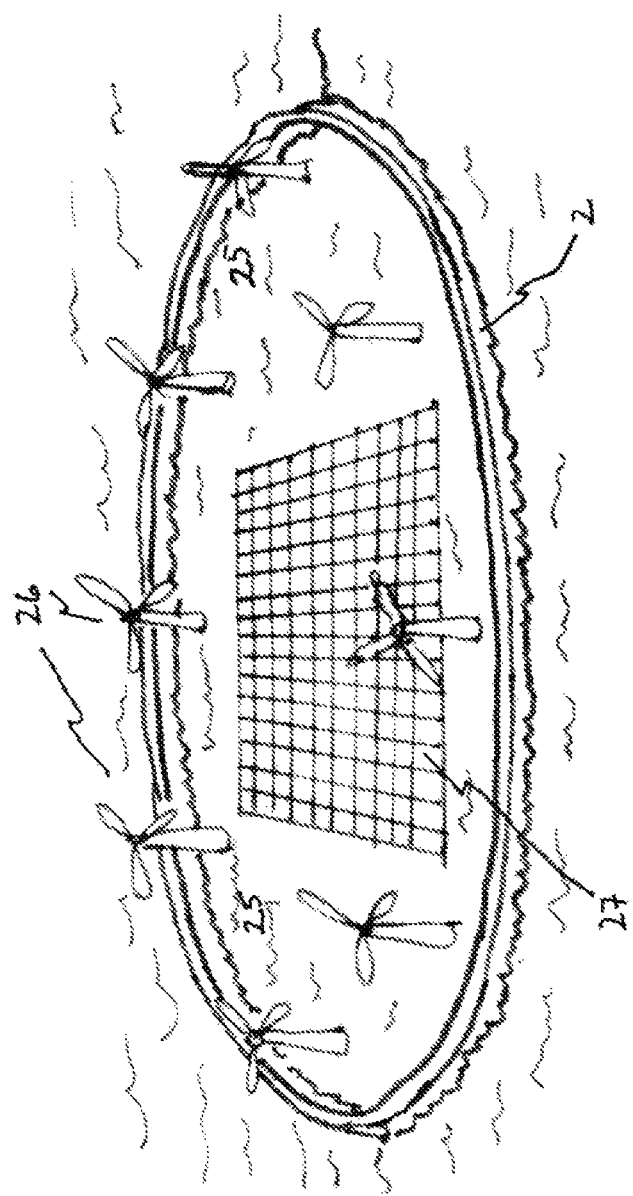

FIG. 4A discloses an energy island lagoon with windmills and solar panels.

Figure 4B:
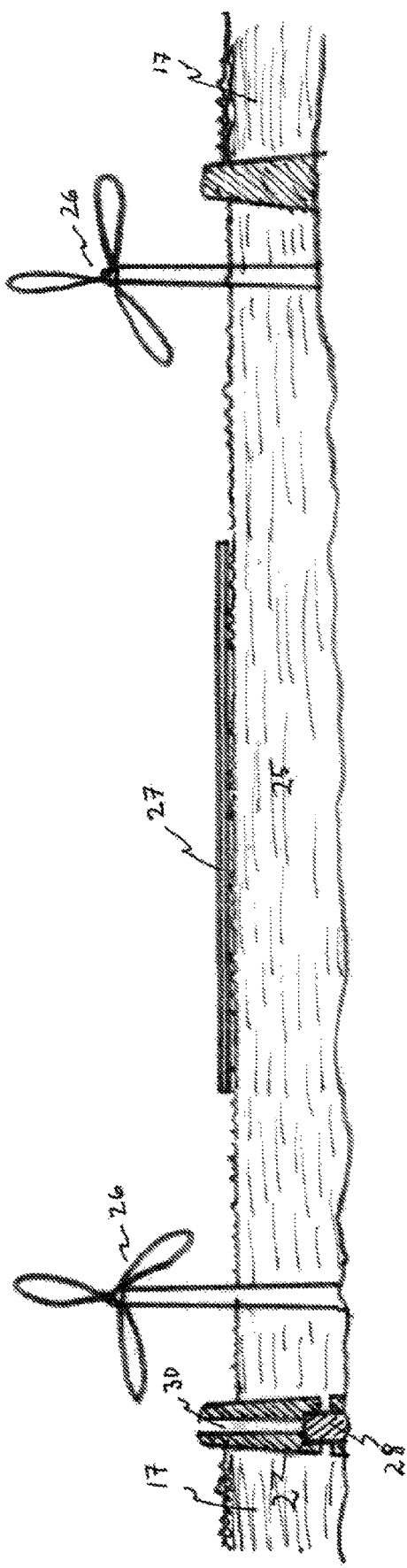

FIG. 4B discloses a sectional view of an energy island lagoon employed as a pumped hydroelectric water reservoir, in a discharged state.

Figure 4C:
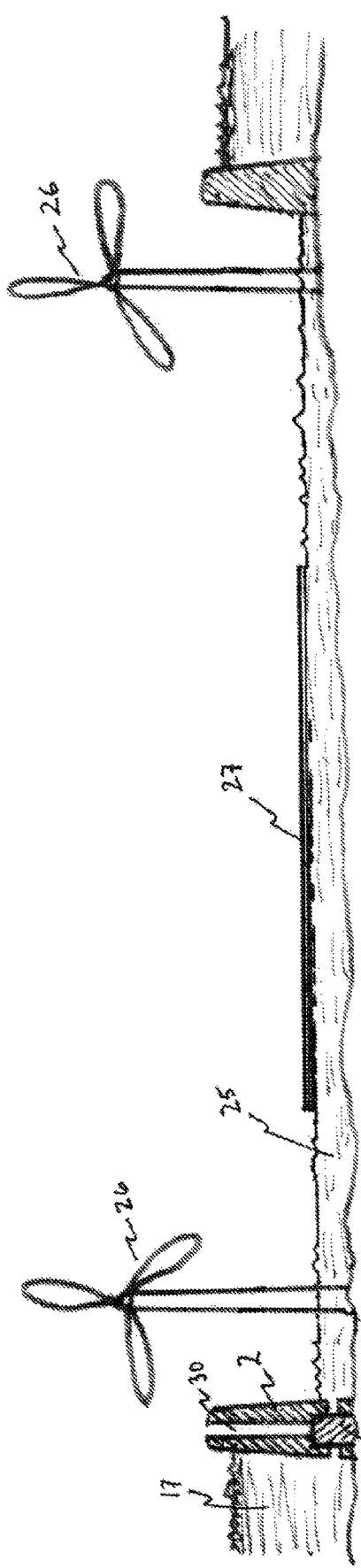

FIG. 4c discloses a sectional view of an energy island lagoon employed as a pumped hydroelectric water reservoir, in a charged state.

LIST OF REFERENCE NUMBERS IN FIGURES

1 Shell
2 Gravity stabilized wall
3 Membrane structure
4 Wall tunnel
5 Capping structure
6 Shaft
7 Branching tunnel
8 Turbine/generator combination
9 Filtering station
10 Geological structure
11 Shaft
12 Underground salt deposit
13 Low permeability stratum
14 Tube
15 Tube
16 Tube
17 Body of water
18 Water flow
19 Brine
20 Pump
21 Tube
22 Cavity
23 Turbine
24 Water/brine
25 Lagoon
26 Windmill
27 Floating solar photoelectric system
28 Turbine/pump combination
30 Access shaft

DESCRIPTION OF PREFERRED
EMBODIMENTS OF THE INVENTION

Various aspects of the disclosure are described more fully hereinafter with reference to the accompanying drawing. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. FIGS. 1A-F illustrate the construction of an energy island according to one preferred embodiment of the present invention. It comprises the followings steps:

Step 1: In FIG. 1A, a site has been selected in a body of water, offshore or in a lake, where the water depth is H and the seafloor topology and geology have been confirmed as suitable for the location of the energy island. A cylindrical shell (1) is positioned as shown, extending between the seafloor and the water surface. The shell is structurally rigid, but is not required to withstand any significant hydrostatic forces, since the water level is essentially the same inside and outside the shell. The shell may be constructed in situ or transported to the site, an example being rings of concrete that are manufactured elsewhere and assembled on site by stacking.

Step 2: FIG. 1B shows how heavy material, e.g. gravel and rocks, has been stacked around the shell (1) to form a gravity stabilized wall (2). The wall has a membrane structure (3) which stops water from the outside to exert pressure on the shell (1). A tunnel (4) provides a hydraulic communication between the interior of the shell (1) and the surrounding body of water.

Step 3: In FIG. 1C, the tunnel (4) has been capped by a structure (5) which controls the flow of water into the volume inside the energy island, termed the lagoon in the following. The water level in the lagoon can now be controlled by pumping water out or allowing it to enter by gravity from the surrounding body of water. In FIG. 1C, all water has been evacuated, exposing the sea floor.

Based on the situation illustrated in FIG. 1C there are many energy related concepts that can be realized. Below, four preferred embodiments shall be described as examples:

Preferred Embodiment: Energy Production by Water Transfer to Subterranean Recipients In FIG. 2A the seafloor inside the shell is dry, permitting excavation equipment to be brought in to create a vertical shaft (6) into the underground, which in this case is characterized by a high permeability substratum (10) under a low permeability mass layer. The bottom of the shaft is shown with branching tunnels (7) communicating with the vertical shaft. In FIG. 2B, a turbine/generator combination (8) has been installed near the bottom of the vertical shaft (6). Not shown in the figure are electrical equipment, cables and transmission lines that enable electrical power generated by the turbine/generator combination to be exported off site. In FIG. 2C, the capping structure (5) has been removed. Water from the surrounding body of water flows through a filtering station (9) and fills the volume inside the shell as well as the vertical shaft (6). The turbine/generator combination (8) is activated by the water rushing down the shaft, under a head h of water as illustrated in FIG. 2C. The spent water is delivered to the system of branching tunnels (7). The latter are located in a geological structure (10) which is characterized by high porosity and permeability, ensuring that the water is transported away at a high rate. In an alternative embodiment, a tube extends directly from the filtering station (9) and into the turbine water intake, in which case the interior of the energy island can be dry. The role of the filtering station (9) is to remove particulates that might otherwise clog up the pores and cracks in the substratum (10) and stop the water flow.

Preferred Embodiment: Pumped Hydro Energy Storage in Excavated Underground Cavity Referring to FIG. 2B, one notes that energy can be produced by filling the excavated volume (7) with water that is directed through the turbine (8), even without there being water transfer (leakage) to the surrounding geological structures (10). Water may be taken from the shaft (6) directly, in analogy with the scheme illustrated in FIG. 2C, or it may be transported in a separate penstock tube from the body of water outside the energy island. When the volume (7) is filled, energy production stops and the system is in a discharged state. The system can be re-charged by supplying electrical energy to a separate pump (not shown) to evacuate the water from the volume (7). In a practical system, a vent to the surface (not shown) may be included, to avoid buildup of compressed air in the excavated volume (7) during discharging, which would reduce the energy storage capacity of the system. Also, the turbine may be positioned at the lowest point in the excavated volume (7) and operate as a pump during the charging cycle.

Preferred Embodiment: Pumped Hydro Energy Storage in Salt Deposits

In FIG. 3A the seafloor has been exposed and a shaft (11) has been drilled into the underground, to a depth where the shaft penetrates into an underground salt deposit (12). The salt is protected by an overlying layer of impermeable rock (13). A tube (14) has been inserted into the shaft (11) and connects via a valve (15) and a tube (16) to the surrounding body of water (17). In FIG. 3B the valve (15) has been opened and a water flow (18) erodes the salt below, creating brine (19). The brine is sucked up by a pump (20) and transported via a tube (21) to the surrounding body of water (17). At a later time, a cavity (22) has been formed and a turbine (23) is installed, as shown in FIG. 3C. Energy can now be stored by pumping out water or brine (24) from the bottom of the cavity via the pump (20) and tube (21) with the valve (15) closed. Energy can be retrieved by opening the valve (15) and activating the turbine (23). Depending on the circumstances, running through several storage/retrieval cycles may erode salt in the cavity, increasing its volume. This may be desirable, increasing the storage capacity of the system. If not, further erosion of salt may be prevented by coating the walls of the cavity with a water resistant material or allowing the salt in the deposit to be removed until reaching an interface with a surrounding rock formation.

Preferred Embodiment: Lagoon Based Energy Storage

FIG. 4A shows a large scale energy island constructed on the same principles as described in connection with FIGS. 1A,B,C. In the example shown, the lagoon (25) inside the wall (2) holds a number of windmills (26) and a floating photovoltaic system (27). The windmills and other installations resting on the seafloor can be assembled and constructed in a dry environment by carrying out the steps illustrated in FIGS. 1A,B,C. The energy island in FIG. 4A can function as a pumped hydro energy storage system, as illustrated in FIGS. 4B,C: In FIG. 4B the water level in the lagoon equals that of the surrounding body of water (17), representing the system in a completely discharged energy state. Energy is stored by activating a pump (28) which transfers water from the lagoon (25) to the body of water (17) outside, lowering the water level in the lagoon in the process. FIG. 4C shows the system in a charged state, where the water level in the lagoon is significantly lower than that of the body of water outside. Extracting energy from the system implies transferring water from the outside of the wall (2) through a turbine (29) and into the lagoon, whereby the water level in the lagoon rises. In many cases, the turbine (29) can be reversed, functioning as a pump (28). In FIGS. 4B,C an access shaft (30) is shown inside the wall (30), providing space for electrical power equipment and inspection personnel.

Preferred Embodiments

The shell (1) may be constructed by the in situ assembly of plastic elements which are consolidated and reinforced through interlocking topographic features and/or internal strength member in channels interior to the shell walls.

The filtering station (9) may employ mechanical sieves in combination with living filtering organisms in the form of tunicates that are located in the water flow path, feeding off organic matter such as algae and planktons. In this way, the filtering station could be part of a farming operation where valuable biological material is created at the same time as clogging of the underground transmission path is prevented.

The invention claimed is:

1. An energy island construction method, wherein the method comprises:
  selecting a body of water with a seafloor, a water surface and a depth over an underground;
  arranging a structurally rigid shell extending from the seafloor to above the water surface, enclosing a lagoon of the body of water;
  stacking material with a negative buoyancy around the shell forming a gravity stabilized wall;
  establishing a tunnel in the wall, providing for hydraulic communication between a surrounding body of water and an interior of the shell;
  capping the tunnel with a capping structure, and evacuating water from the lagoon;
the construction method further comprising at least one of:
  excavating a shaft in the underground below the interior of the shell into a permeable substratum;
  excavating at least one branching tunnel, the branching tunnel at least partially located in the permeable substratum, and in hydraulic communication with the shaft; and
  arranging a turbine/generator combination in the shaft;
or
  excavating a shaft in the underground below the lagoon into a salt deposit below an impermeable stratum; and
  arranging an input tube structure allowing water to pass from the body of water into the salt deposit establishing a cavity in the salt deposit.

2. The energy island construction method according claim 1, wherein the method comprises arranging a watertight membrane structure in the wall, the membrane structure being configured to prevent surrounding water from exerting pressure on the shell.

3. The energy island construction method according to claim 1, wherein the method comprises arranging a filtering station configured to filter water passing through the tunnel.

4. The energy island construction method according to claim 1, wherein the method further comprises:
  arranging a pump configured to evacuate water from the branching tunnel providing for pumped hydro energy storage.

5. The energy island construction method according to claim 1, wherein the method comprises removing the capping structure allowing water flow through the tunnel from the surrounding body of water, filling the lagoon, and flowing down the shaft activating the turbine/generator combination.

6. The energy island construction method according to claim 1, wherein the method further comprises:
  arranging a pump in the cavity in connection with an output tube structure for pumping liquid out of the cavity; and
  arranging a turbine in the cavity in connection with the input tube structure, the turbine being configured to be activated by water flow in the input tube structure.

7. The energy island construction method according to claim 1, wherein the method further comprises:
  arranging a pump configured to evacuate water from the lagoon into the body of water, and a turbine configured to be activated by water from the body of water flowing through the turbine providing for lagoon based energy storage and production.

8. The energy island construction method according to claim 7, wherein the pump and the turbine are arranged relative to a hole in the wall allowing for water flow between the body of water and the lagoon.

9. An energy island system arranged relative to a body of water with a seafloor, a water surface and a depth over an underground, the system comprising:
  a structurally rigid shell extending from the seafloor to above the water surface, enclosing a lagoon of the body of water;
  material with a negative buoyancy stacked around the shell forming a gravity stabilized wall;
  a tunnel established in the wall, providing for hydraulic communication between a surrounding body of water and an interior of the shell;
  the energy island system further comprising at least one of:
  a shaft extending into the underground below the interior of the shell into a permeable substratum;
  at least one branching tunnel, the branching tunnel being at least partially located in the permeable substratum, and in hydraulic communication with the shaft; and
  a turbine/generator combination arranged in the shaft;
or
  a shaft excavated in the underground below the lagoon into a salt deposit below an impermeable stratum; and
  an input tube structure allowing water to pass from the body of water into the salt deposit establishing a cavity in the salt deposit.

10. The energy island system according to claim 9, the system further comprising a capping structure arranged for capping the tunnel, and allowing water evacuation from the lagoon.

11. The energy island system according to claim 10, the system further comprising:
  a watertight membrane structure arranged in the wall, the membrane structure configured to prevent the surrounding water from exerting pressure on the shell.

12. The energy island system according to claim 10, wherein the capping structure is removable for allowing water flow through the tunnel from the surrounding body of water, filling the lagoon, and flowing down the shaft activating the turbine/generator combination.

13. The energy island system according to claim 9, wherein the system comprises a filtering station configured to filter water passing through the tunnel.

14. The energy island system according to claim 13, wherein the filtering station comprises mechanical sieves in combination with living filtering organisms in the form of tunicates.

15. The energy island system according to claim 9, wherein the system further comprises a pump arranged to evacuate water from the branching tunnel providing for pumped hydro energy storage.

16. The energy island system according to claim 9, wherein the system further comprises:
  a pump arranged in the cavity in connection with an output tube structure for pumping liquid out of the cavity; and
  a turbine in the cavity arranged in connection with the input tube structure, the turbine being configured to be activated by water flow in the input tube structure.

17. The energy island system according to claim 9, wherein the system further comprises a pump arranged to evacuate water from the lagoon into the body of water, and a turbine configured to be activated by water from the body of water flowing through the turbine providing for lagoon based energy storage and production.

18. The energy island system according to claim 17, wherein the pump and the turbine are arranged relative to a hole in the wall allowing for water flow between the body of water and the lagoon.

* * * * *